US006983267B2

(12) United States Patent
Hamadou et al.

(10) Patent No.: US 6,983,267 B2
(45) Date of Patent: Jan. 3, 2006

(54) SYSTEM HAVING A MODEL-BASED USER INTERFACE FOR OPERATING AND MONITORING A DEVICE AND A METHOD THEREFOR

(75) Inventors: Mehdi Hamadou, Erlangen (DE); Werner Hoffmann, Herzogenaurach (DE); Josef Meixner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 562 days.

(21) Appl. No.: 09/771,631

(22) Filed: Jan. 30, 2001

(65) Prior Publication Data

US 2002/0059050 A1    May 16, 2002

Related U.S. Application Data

(63) Continuation of application No. PCT/DE99/02227, filed on Jul. 19, 1999.

(30) Foreign Application Priority Data

Jul. 30, 1998    (DE)    ................ 198 34 456

(51) Int. Cl.
*G06F 15/18*    (2006.01)
(52) U.S. Cl. ...................................... 706/59
(58) Field of Classification Search ............ 706/45–60;
703/13, 9
See application file for complete search history.

(56) References Cited

U.S. PATENT DOCUMENTS 4,939,668 A * 7/1990 Brown et al. ................. 706/59

4,965,743 A    10/1990 Malin et al.
5,754,738 A *  5/1998 Saucedo et al. ............... 706/11

FOREIGN PATENT DOCUMENTS

| DE | 196 39 424 A1 | 3/1997 |
| EP | 0 549 504 A2  | 6/1993 |
| EP | 0 770 945 A1  | 5/1997 |
| JP | 10097550      | 4/1998 |
| WO | WO 97/50021   | 12/1997 |

OTHER PUBLICATIONS

Larsen, Amy K, The Next Web Wave, Data Communications vol. 25, No. 1 (Jan. 1996), pp. 31-32, 34.

* cited by examiner

*Primary Examiner*—Anthony Knight
*Assistant Examiner*—Michael B. Holmes
(74) *Attorney, Agent, or Firm*—Sughrue Mion, PLLC

(57) ABSTRACT

A system (1, 2) and an associated method for a dynamic management of information data. The information data are in the form of information sources I of a virtual device K, which includes a plurality of virtual subcomponents T1 . . . Tn. The virtual device K represents a real device (20), for instance an industrial facility. A comprehensive overview of the entire system as well as specific views of the subcomponents of the device are achieved in that the virtual subcomponents are embedded as programs and/or data in a networking frame structure. Therein, the virtual subcomponents correspond to technological structures of the real device (20). The system has a data processing device (2) to manage the information data I associated with the virtual device K and to control access to the information data I. Local and/or global addresses are assigned to the virtual device K and its virtual subcomponents T1 . . . Tn. These addresses allow a user to perform a component-based navigation and a model-based navigation in different views S1 . . . SN of the system.

14 Claims, 12 Drawing Sheets

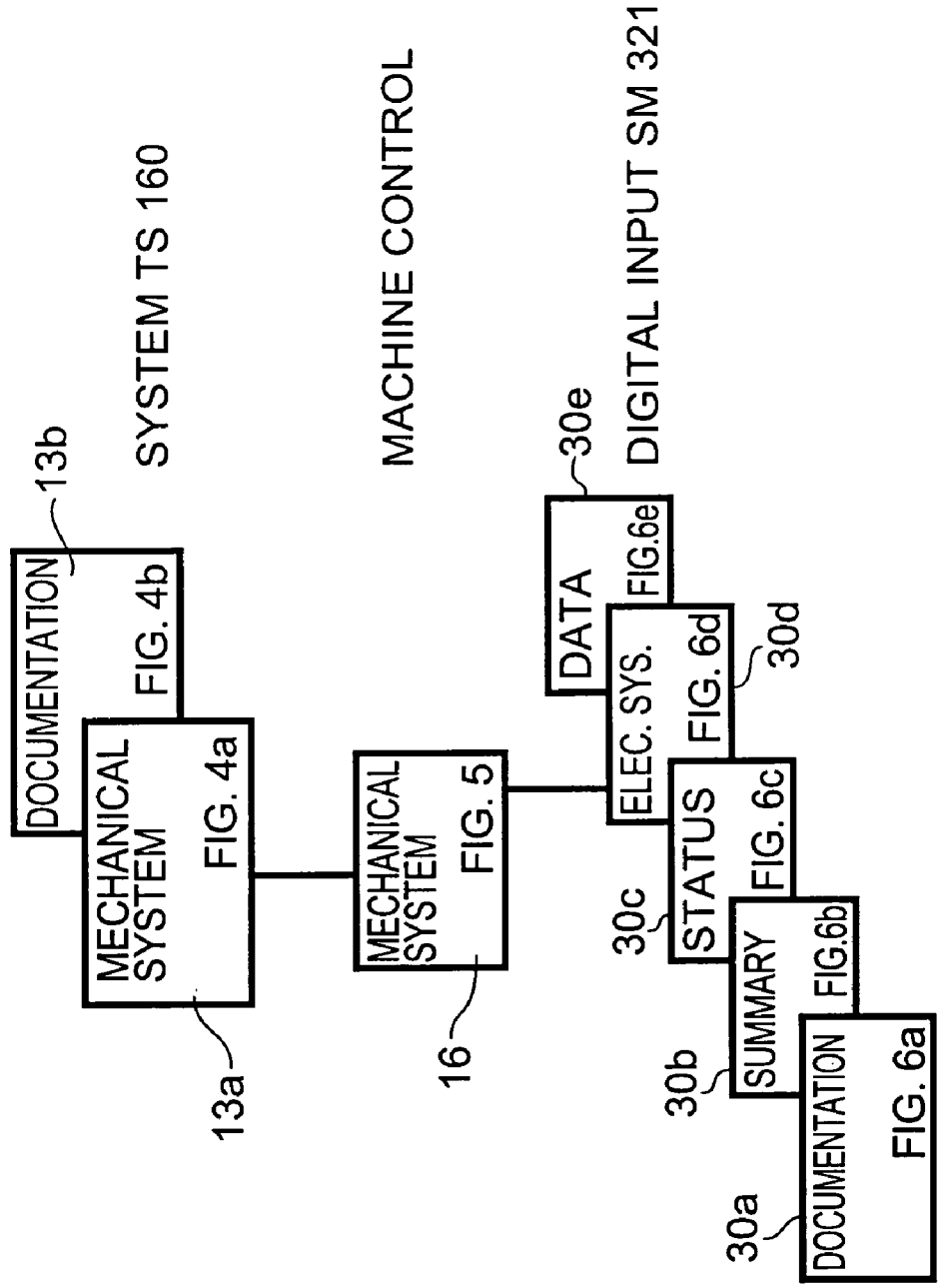

FIG. 6e

Digital Input SM 321

▲ Technical Data

| SM 321 6ES7 321 | 1BH01-0AA0 | 1BH50-0AA0 | 1BI00-0AA0 |
|---|---|---|---|
| Number of Inputs | 16 | 16;m-reading | 32 |
| Load Nominal Voltage | | | |
| • Nominal Value | DC 24 V | DC 24 V | DC 24 V |
| • Permissible Range | 20.4 V to 28.8 V | | |
| Input Voltage | | | |
| - Nominal Value | DC 24 V | DC 24 V | DC 24 V |
| - Frequency | - | - | - |
| Potential Division | Optical Coupler | | |
| Input Current at Signal "1" | 7.0 mA | 7.0 mA | 7.0 mA |
| Power Loss | 3.5 W | 3.5 W | 4 W |

Component
Digital Input SM 321

Views
• Summary
• Status
• Electrical System
• Documentation
• Technical Data

SYSTEM HAVING A MODEL-BASED USER INTERFACE FOR OPERATING AND MONITORING A DEVICE AND A METHOD THEREFOR

This is a Continuation of International Application PCT/DE99/02227, with an international filing date of Jul. 19, 1999, which was published under PCT Article 21(2) in German, and the disclosure of which is incorporated into this application by reference.

FIELD OF AND BACKGROUND OF THE INVENTION

The present invention relates to an information, operation and monitoring system for a real device, wherein the real device includes several real subcomponents. In particular, this real device can be, e.g., an automation system.

The invention further relates to a method for operating and/or monitoring a real device, which includes several subcomponents.

Such an information, operation and monitoring system is used, for example, in the field of automation technology. For example, process data of an automation system is frequently represented or displayed by special operation-and-monitoring-systems, whereas user documentation, for instance, is often available on paper only. A user, who is operating an automation system, is therefore often confronted with a wide variety of different data sources. In other words, these different data sources are not represented or displayed on a uniform user interface.

OBJECTS OF THE INVENTION

It is one object of the present invention to provide a user interface that permits simple access to information data of a device, in particular a complex device such as an industrial facility.

SUMMARY OF THE INVENTION

According to one formulation of the present invention, this and other objects are achieved by an information, operation and monitoring system for a real device, in particular an automation system. Therein, the real device includes several subcomponents. The information, operation and monitoring system includes a data processing device. This data processing device includes a model, which is a representation of the real device. The model, in turn, includes virtual components. In addition, the data processing device includes views, e.g., views of the virtual components that are displayed on screen windows of a monitor screen. These views correspond respectively to the virtual components. The model has a model structure, which is stored in the data processing device. The model structure is formed by linking the virtual components in correspondence to the relationships of or within the real device, for example the technical relationships between the respective real subcomponents of the real device. The virtual components and/or views include access data to access local and/or global information data, which are associated with the virtual components.

According to another formulation of the present invention, this object and other objects of the present invention are achieved by a method for operating and/or monitoring a real device, particularly an automation system, which includes several subcomponents. Through this method, a user navigates within a model stored in a data processing device. This model includes virtual components that represent the real device. Furthermore, the model includes views, e.g., views of the virtual components displayed on screen windows on a monitor screen. These views correspond to the virtual components. A model structure, which is stored in the data processing device, is associated with the model. This model structure is formed by linking the virtual components in correspondence to the relationships of or within the real device, for example the technical relationships between the respective real subcomponents of the real device. The user accesses, via access data, local and/or global information data, which are associated with the virtual components. Therein, the access data are assigned to the components and/or the views.

Such an information, operation and monitoring system enables the user to monitor and control even complex industrial facilities via a uniform user interface. This is achieved in that the data processing device includes the model, which represents the real device/industrial facility. The model includes the virtual components, which are linked in correspondence to the physical relationships of or within the real device/industrial facility. This structure of technical components creates a frame structure, in which the corresponding information data can be "embedded." The user sees the various technical components as different views, e.g., on a screen, that display respective information. The component views include e.g. respective access data, by means of which the user can access the different views. Thus, the user can access the different virtual components of the entire device. Hence, these cross-references (also referred to as links) enable the user to navigate within the facility. The user can also specifically access a wide variety of information data regarding the different components. By networking different parts of the automation system, e.g., via the internet, external information data (i.e., information data stored outside the facility) may be integrated in the views associated with the facility. In addition, such a connection to the internet, for example, allows a user to operate and monitor the automation system from any arbitrary location.

The user's navigation within the device is further enhanced in that the model has a virtual device, which is a representation of the real device. Furthermore, the model has virtual subcomponents, which represent the real subcomponents of the real device/facility. The virtual device and the virtual subcomponents are embodied as data and/or data processing programs, which are linked with one another in correspondence to the operational, physical and/or technical relationships of the real subcomponents of the real device.

Even in complex devices, which have numerous individual components and information data associated therewith, a clear overview/organization is ensured, e.g., for operating and monitoring a respective complex device, in that the data processing programs are embedded in a program frame via cross-references. The program frame and/or the cross-references for the navigation by a user permit the user to access the virtual device and/or the virtual subcomponents.

An active or passive coupling of the data processing device with the real device, and thus a control of the real device, is achieved in a simple manner in that the system has a connection between the data processing device and the real device. For instance, the data processing device has a transmit and/or receive component to transmit and/or receive data. The connection between the data processing device and the real device is provided for unidirectional or bi-directional transmission of control data and process data.

This turns the information system according to the present invention into a comprehensive operation and monitoring system.

A user friendly system operation, even without special training of the user, is supported by the system and method according to the present invention in that the information sources are structured in such a way that technologically different subcomponents are associated with the virtual device. In addition, the subcomponents are each associated with further technologically structured subordinate components. The access data are provided to allow the user to navigate through the virtual device, through the subcomponents, and through the subordinate components, which are associated with the virtual device.

BRIEF DESCRIPTION OF THE DRAWINGS

The invention and further advantageous refinements of the invention according to the features of the dependent claims are explained in more detail below with the aid of diagrammatic, exemplary embodiments in the drawings, in which:

FIG. 3 is an overview of a model structure and of a data structure associated with a spray machine TS 160;

FIGS. 6a–6e are views of subordinate components of the subcomponent "machine control" of the spray machine TS 160.

DETAILED DESCRIPTION OF THE PREFERRED EMBODIMENTS

Figure 1:
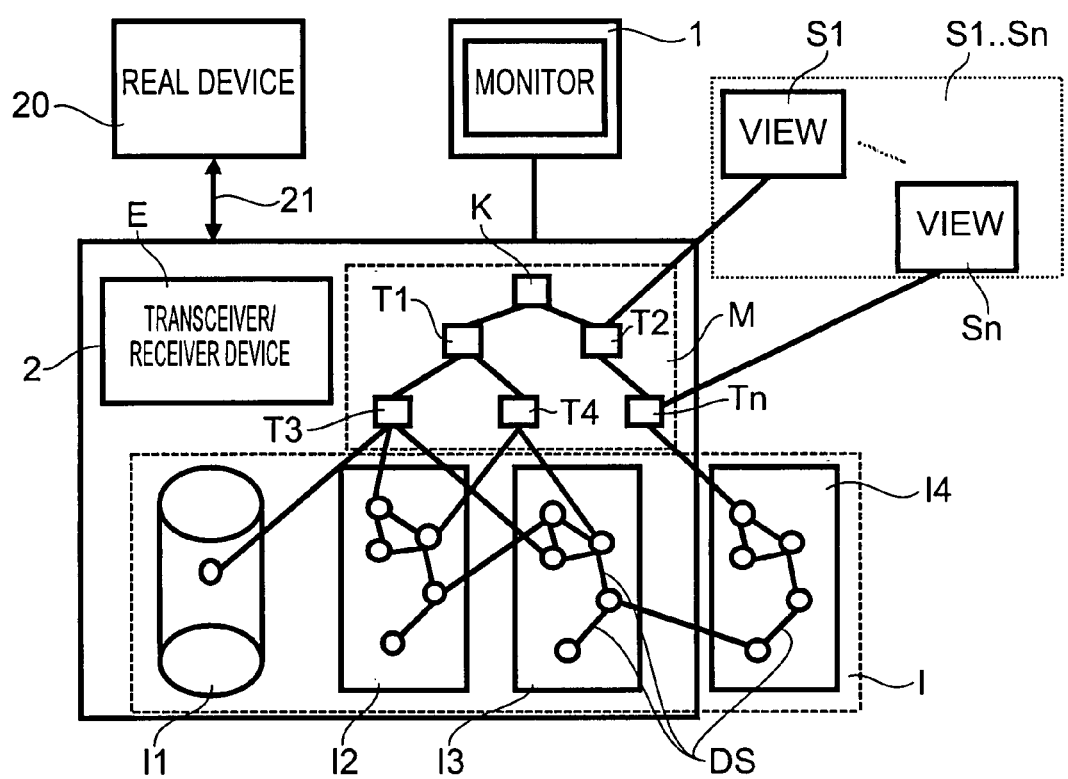
FIG. 1 is a schematic diagram of an information, operation, and monitoring system, together with an illustration of information structures of the system.

FIG. 1 is a schematic diagram of an information, operation and monitoring system according to the present invention. The information, operation and monitoring system includes a data processing device 2, which has a monitor 1 connected thereto. A connection line 21 is provided between a transmission/receiving device E of the data processing device 2 and a real device/facility 20, which is, for instance, a spray machine. A model structure M is stored in the data processing device 2 and represents a model of the real device that is composed of virtual components. A virtual component K represents the real device 20 in its entirety, whereas virtual subcomponents T1 . . . Tn represent the real subcomponents of the entire system. These virtual subcomponents T1 . . . Tn are linked to one another in correspondence to the physical-technical and/or operational relationships of or within the real device 20. The virtual components K, T1 . . . Tn are linked by means of a data structure DS with information data I. This information data I may be stored either locally in the local data processing device 2 or in any computer connected with the data processing device 2. In the preferred embodiment depicted in FIG. 1, the information data I1 . . . I3 are locally stored information data. In contrast, the information data I4 may, e.g., be stored, via an internet connection, on any computer connected to the internet. Respective views S1 . . . SN are associated with the virtual components K, T1 . . . Tn. The views S1 . . . SN enable the information data I1 . . . I4 to be presented to the user. The views S1 . . . SN include access data to access the local and/or global information data I associated with the virtual components K, T1 . . . Tn. This interdependence between the model structure M, the information data I1 . . . I4, and the views S1 . . . SN is symbolized by the networked data structure DS shown in FIG. 1.

Thus, the information, operation and monitoring system depicted in FIG. 1 creates a frame structure that provides the user with all the available information data I about the real device 20 in a simple manner. Hence, the user will not get lost in an overabundance of information. This frame structure is achieved by dividing the real device 20 into the virtual components K, T1 . . . Tn. The respective views S1 . . . SN, which are associated with the components K, T1 . . . Tn, permit the user to navigate the different information sources I1 . . . I4. Therein, it is not important where the corresponding information data I1 . . . I4 are stored. The assignment of the information data I1 . . . I4 is thus preferably not static but dynamic, in contrast to the known operation data, which is stored, for instance, on a CD-ROM. The information data I1 . . . I4 are always up-to-date, and, e.g., take any product changes in individual technical components into account. In addition to an extensive data overview, which may also include operating instructions, the user has uniform user interfaces available to operate and monitor the real device 20, for example. These users interfaces include the different views S1 . . . SN for all operation actions and monitoring actions. The fixed data structure DS of the virtual components K, T1 . . . Tn ensures that the user cannot get lost in the linkage of the different information data I1 . . . I4.

The preferred embodiment shown in FIG. 1 is merely a rough schematic diagram of the information, operation, and monitoring system according to the present invention. The system may be modified in many different ways. For instance, the system may be used purely as a documentation system, in which case no connecting line 21 is required between the real device 20 and the information system. In this case too, the information system can be changed dynamically, i.e., the documentation may be continuously updated by assigning new links or by updating already existing components.

Figure 2:
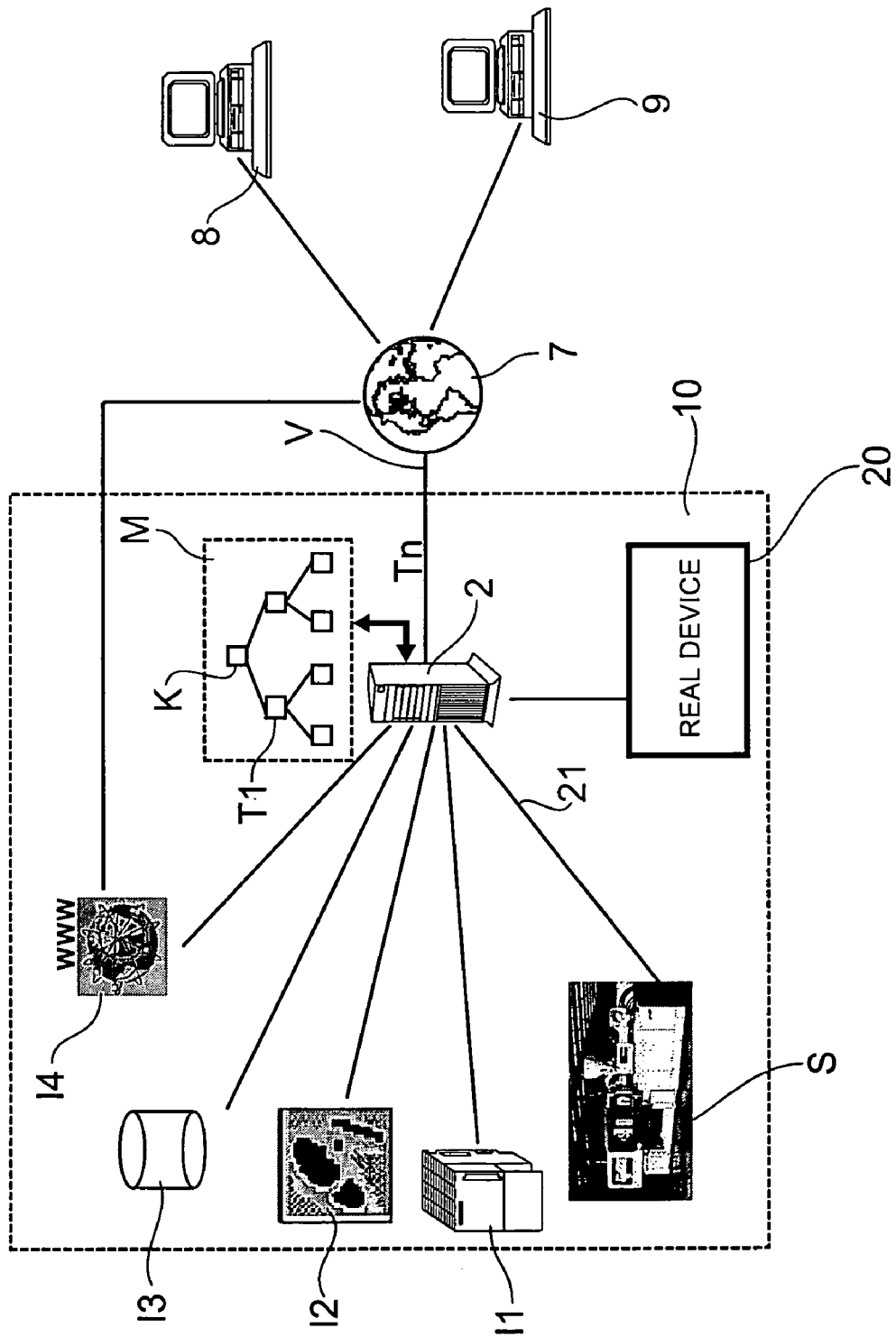
FIG. 2 is an exemplary embodiment of an automation system having a user interface that may be connected to the internet.

FIG. 2 shows an exemplary embodiment of an automation system 10. The automation system 10 is connected to the internet 7 via a connection V. Via the internet 7 and the connection V, the automation system 10 may be connected with computers 8, 9. The automation system 10 further includes the real device 20, which is coupled with the data processing device 2 via the connecting line 21. The real device 20 can be, for example, a spray machine S. As described in connection with FIG. 1, the data processing device 2 includes a model M, in which the various information data I1, I2, I3, I4 are embedded in the form of virtual components K, T1 . . . Tn. The information data I1, I2 relate, for example, to virtual subcomponents, which represent control devices of the real device 20. The information data I3 relate, for example, to operating instructions or technical documentation, and the information data I4 relate, for example, to information sources available on the internet.

The exemplary embodiment depicted in FIG. 2, in which the data processing device 2 is connected to the internet via the connection V, illustrates that the information, operation and monitoring system of the real device 20 may be accessed from any of the computers 8, 9 via the internet. The connection to the internet 7 also allows for accessing the information data 14 on the world wide web. The computer 8, which is embodied as a control station, for example, may be used to perform remote maintenance of the real device 20. In normal operation, an operator may access the real device 20 via the computer 9.

Figure 4A:
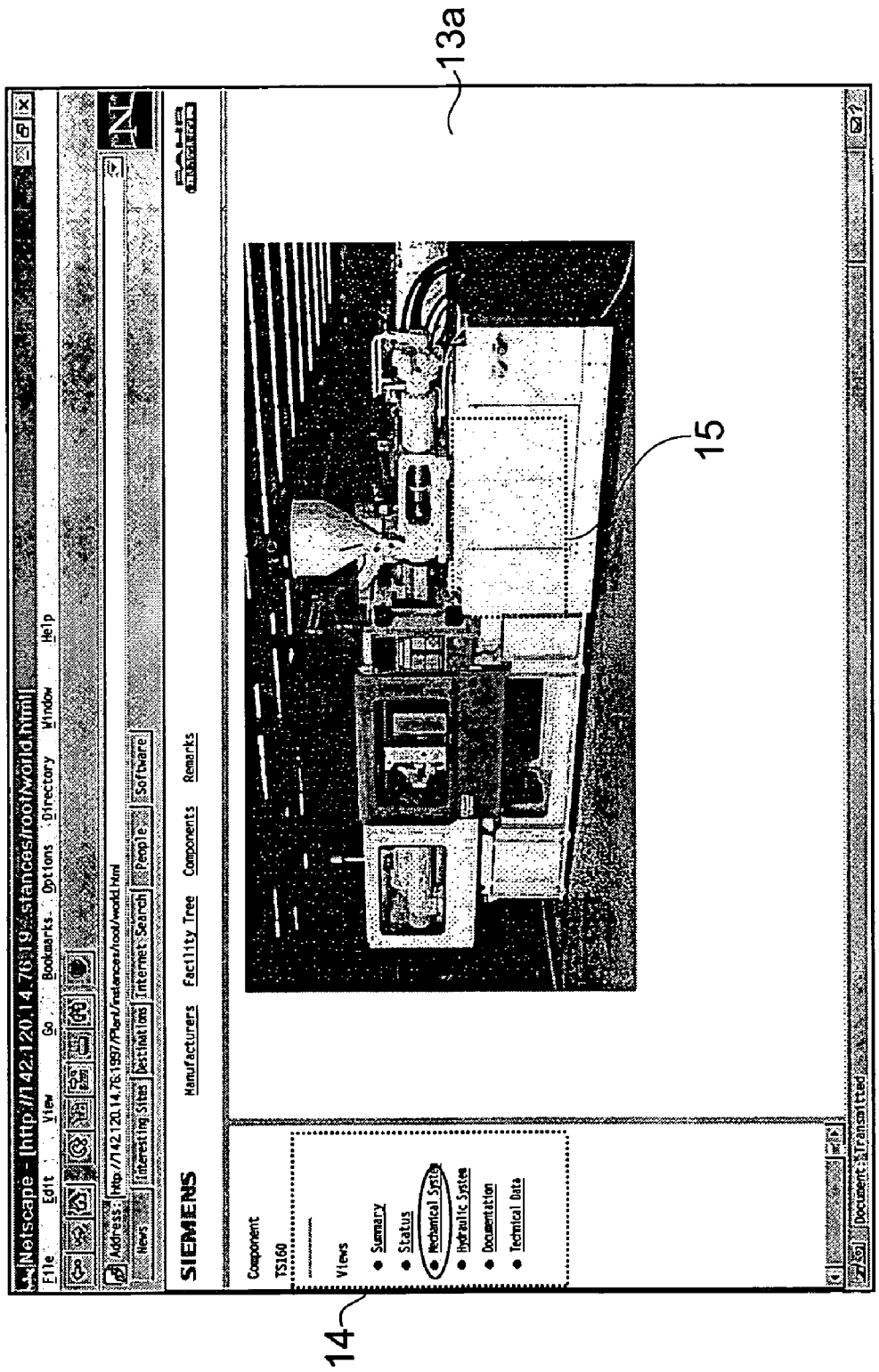
FIGS. 4a and 4b are views of model components of the spray machine TS 160.
Figure 4B:
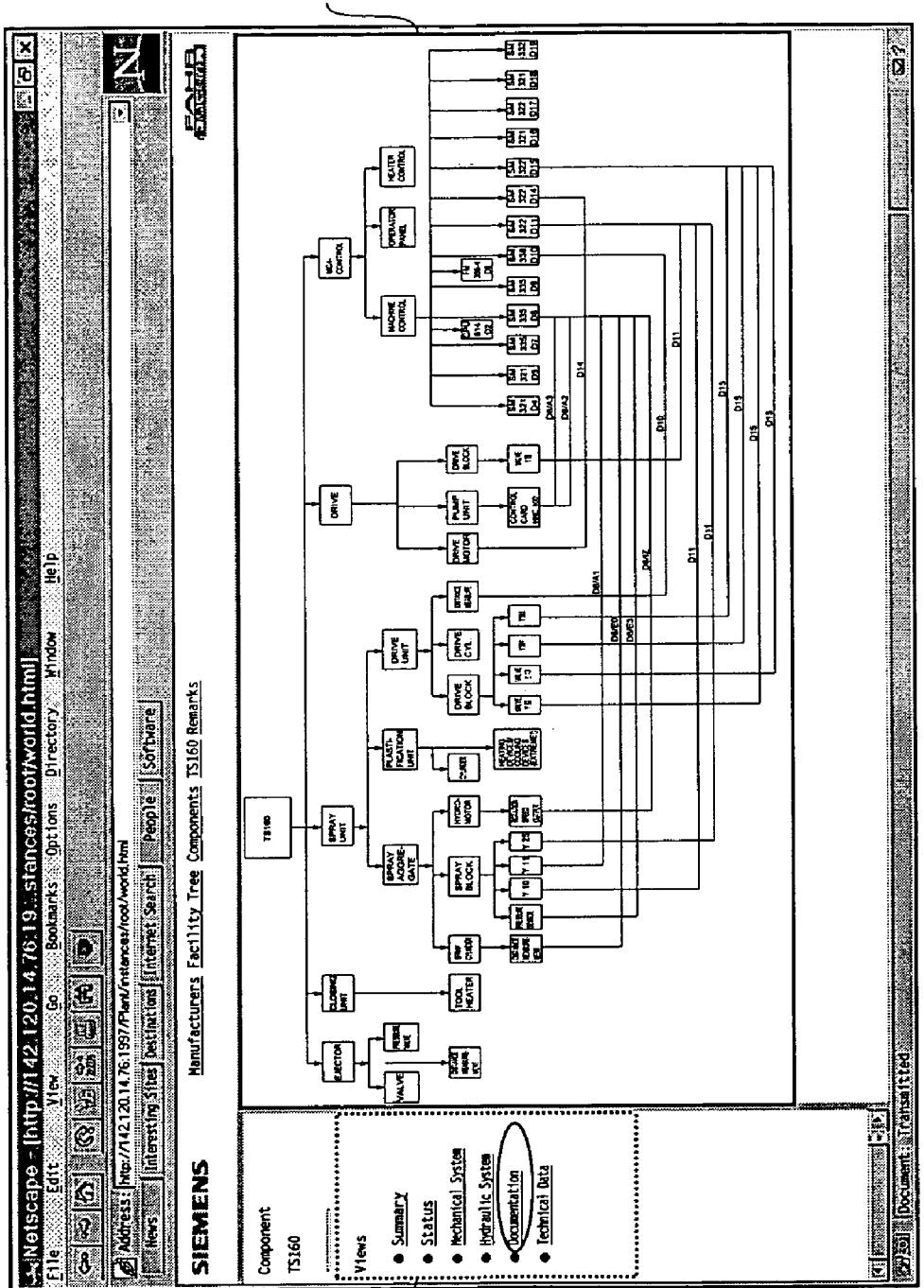

FIG. 3 shows an overview of a preferred model structure and of a preferred data structure employing the subcomponent views of a spray machine TS 160 depicted in FIGS. 4a, 4b, FIG. 5, and FIGS. 6a . . . 6e. The spray machine TS 160 is an example of the real device 20 shown in FIGS. 1 and 2. The lower portions of the boxes of FIG. 3 indicate which of these Figures depict which respective subcomponent view. The data structure of the preferred embodiment shown in FIG. 3 includes two higher-level views 13a, 13b. The view 13a includes an overview image of the spray machine TS 160. This overview is shown in FIG. 4a in the form of a virtual component. The view 13b includes a documentation view of the spray machine TS 160, as shown in FIG. 4b. A further view 16 includes information data for the machine control of the spray machine TS 160, wherein the machine control is a subcomponent of the entire system. This view 16 is subordinate to the views 13a, 13b and depicts an image of the machine control. Further virtual components 30a . . . 30e are associated with the view 16. Therein, the view 30a relates to the "documentation" for an individual component of the machine control, while the other views 30b . . . 30e relate to the information data "summary," "status," "electrical system" and "technical data."

FIG. 3 is an exemplary embodiment of a model-based data structure of the virtual components associated with the spray machine TS 160, wherein the data structure includes the respective views depicted in FIGS. 4a, 4b, FIG. 5, and FIGS. 6a . . . 6e. This data structure allows the user to navigate in the different views for the purpose of acquiring information about the spray machine TS 160, and for the purposes of operating and/or monitoring the spray machine TS 160.

FIG. 4a shows the first view 13a of the spray machine TS 160. The view 13a depicts a digital image representing the spray machine TS 160. In the left margin of the screen section shown in FIG. 4a, a menu bar 14 is arranged, which includes the currently available views of the spray machine TS 160. FIG. 4a shows the mechanical system of the spray machine TS 160. Other available views concern information on "summary," "status," "mechanical system," "hydraulic system" and "technical data" of the spray machine TS 160. By selecting the corresponding menu items from the menu 14, the user can change the view 13a to the other views that are currently available within the predefined model structure. In the view 13a, the user can specifically select certain individual components, for instance by pointing and clicking with a mouse on the screen. For example, an area 15, which includes the machine control of the spray machine TS 160, is marked on the screen. By clicking and, therefore, selecting this screen area 15, for instance, the user can activate a view associated with this virtual component.

Figure 5:
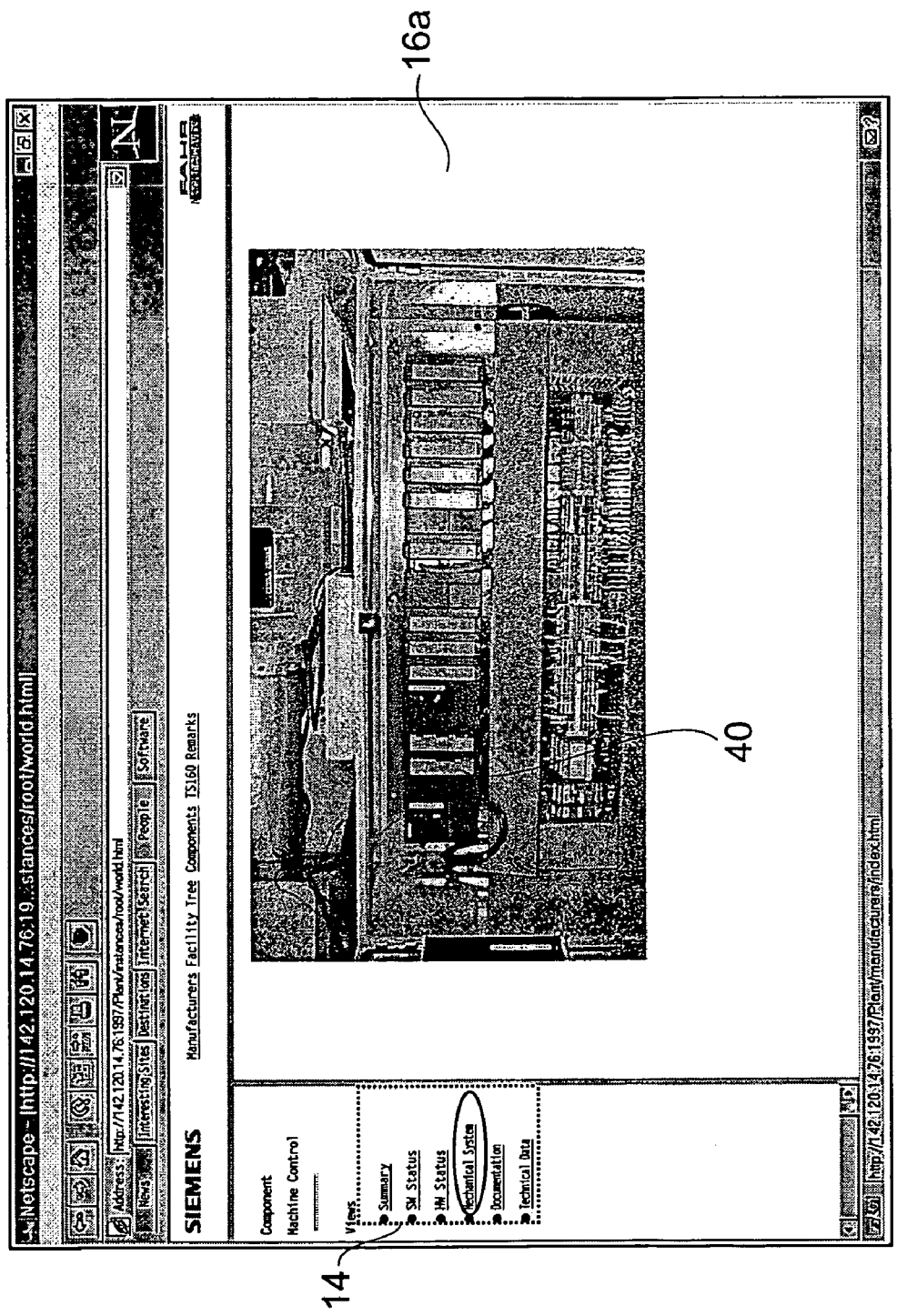
FIG. 5 is a view of the subcomponent "machine control" of the spray machine TS 160.

FIG. 5 depicts such an activated view of the mechanical system of the machine control, which is included in the screen area 15 of the view 13a, as shown in FIG. 4a. Again, the user can select different views of the machine control from the menu 14. Alternatively, by selecting certain partial areas of the machine control, for instance a screen area 40, the user can activate individual components of the machine control as separate views. By selecting the area 40, the user reaches a further virtual subcomponent within the predefined model, i.e., a digital input SM 321 of the machine control.

Figure 6A:
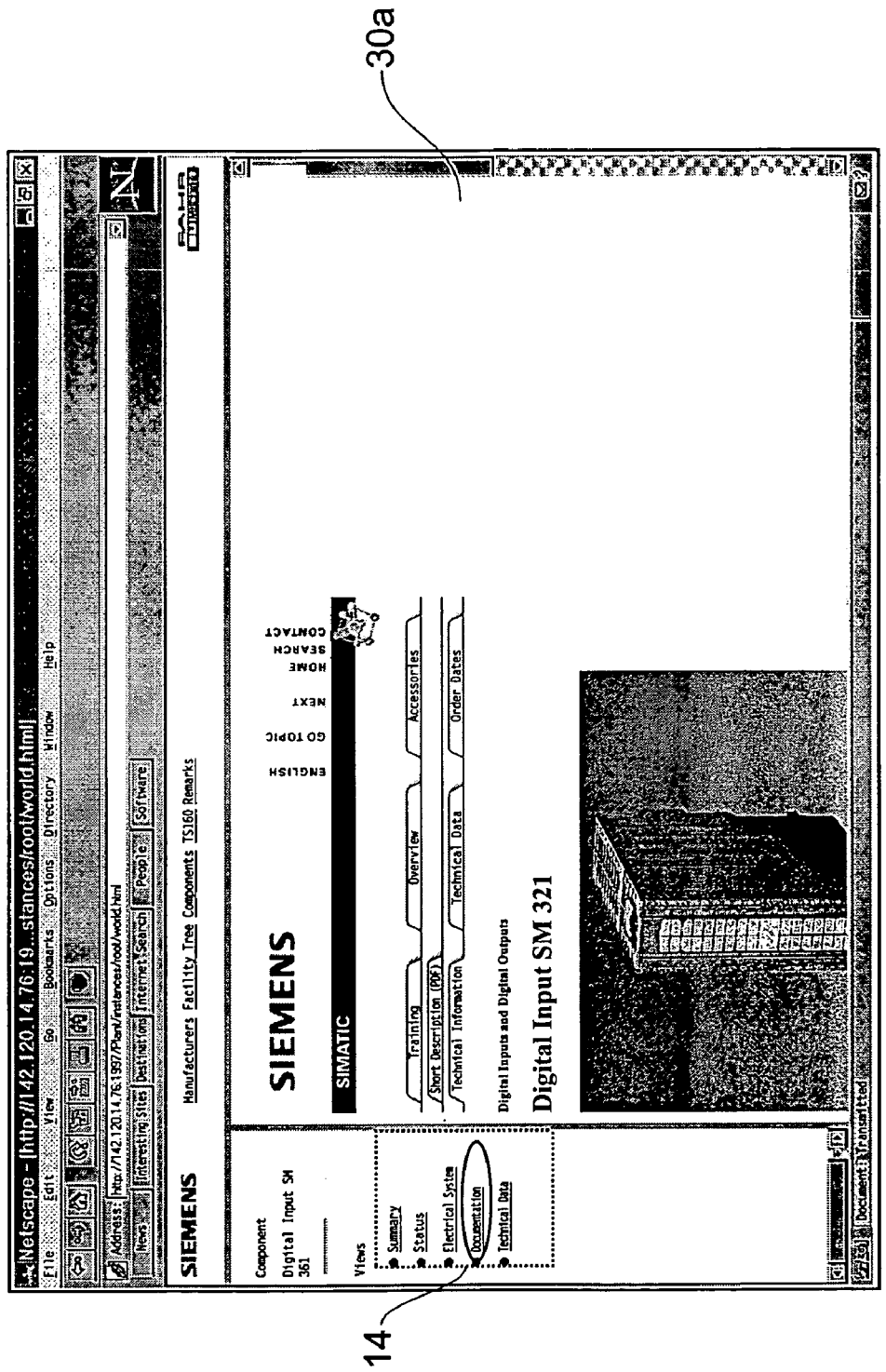
Figure 6B:
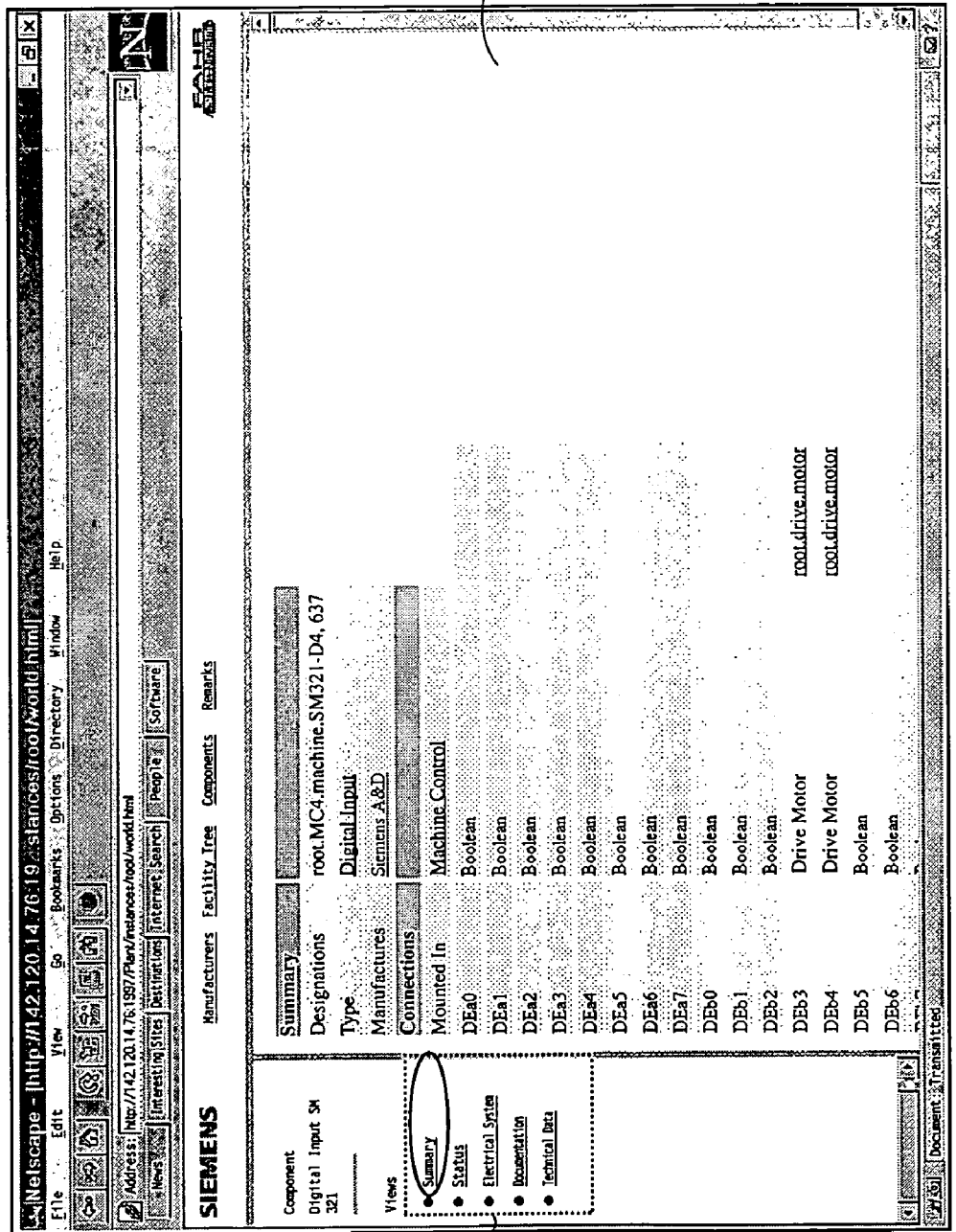
Figure 6C:
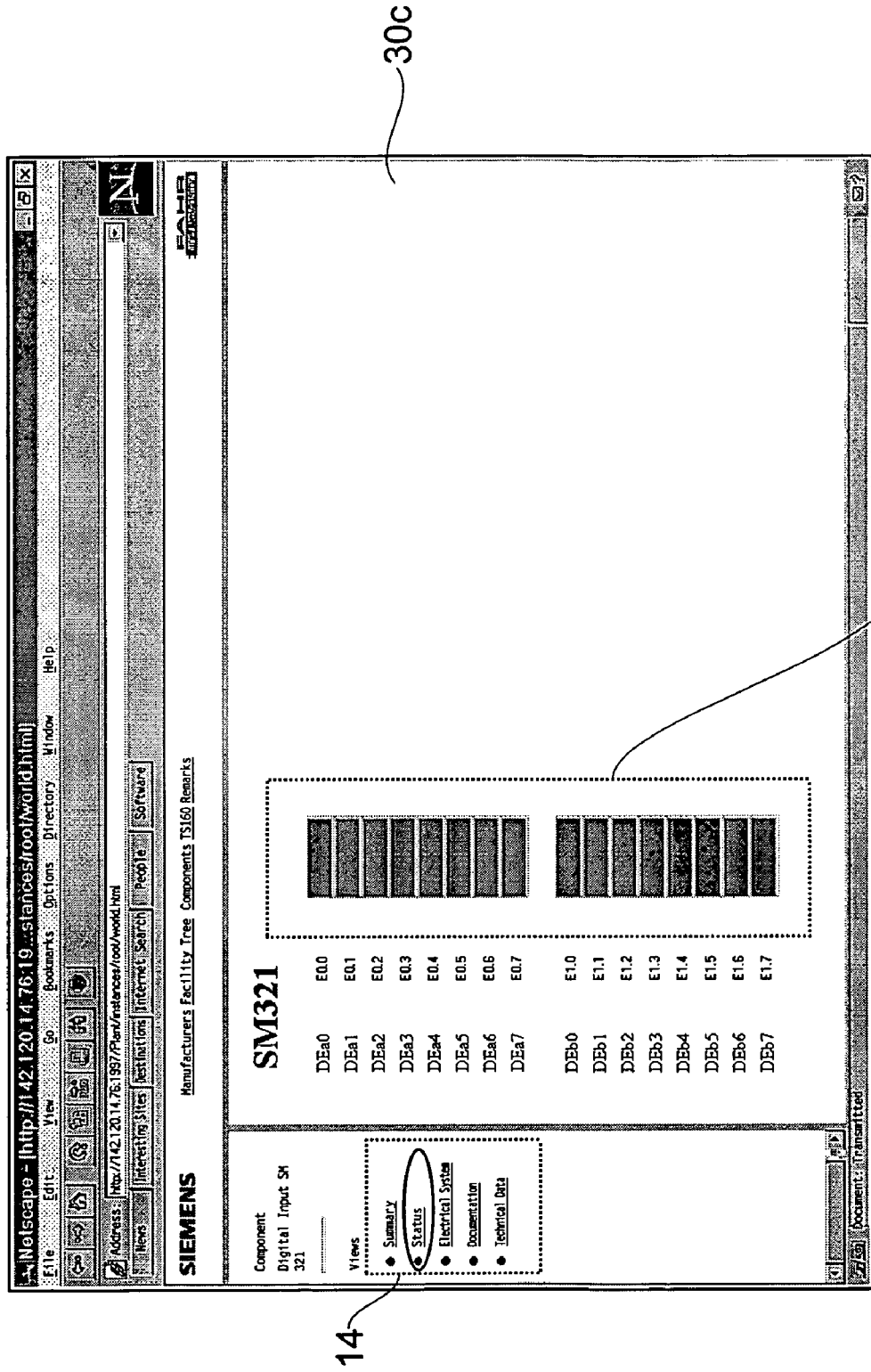
Figure 6D:
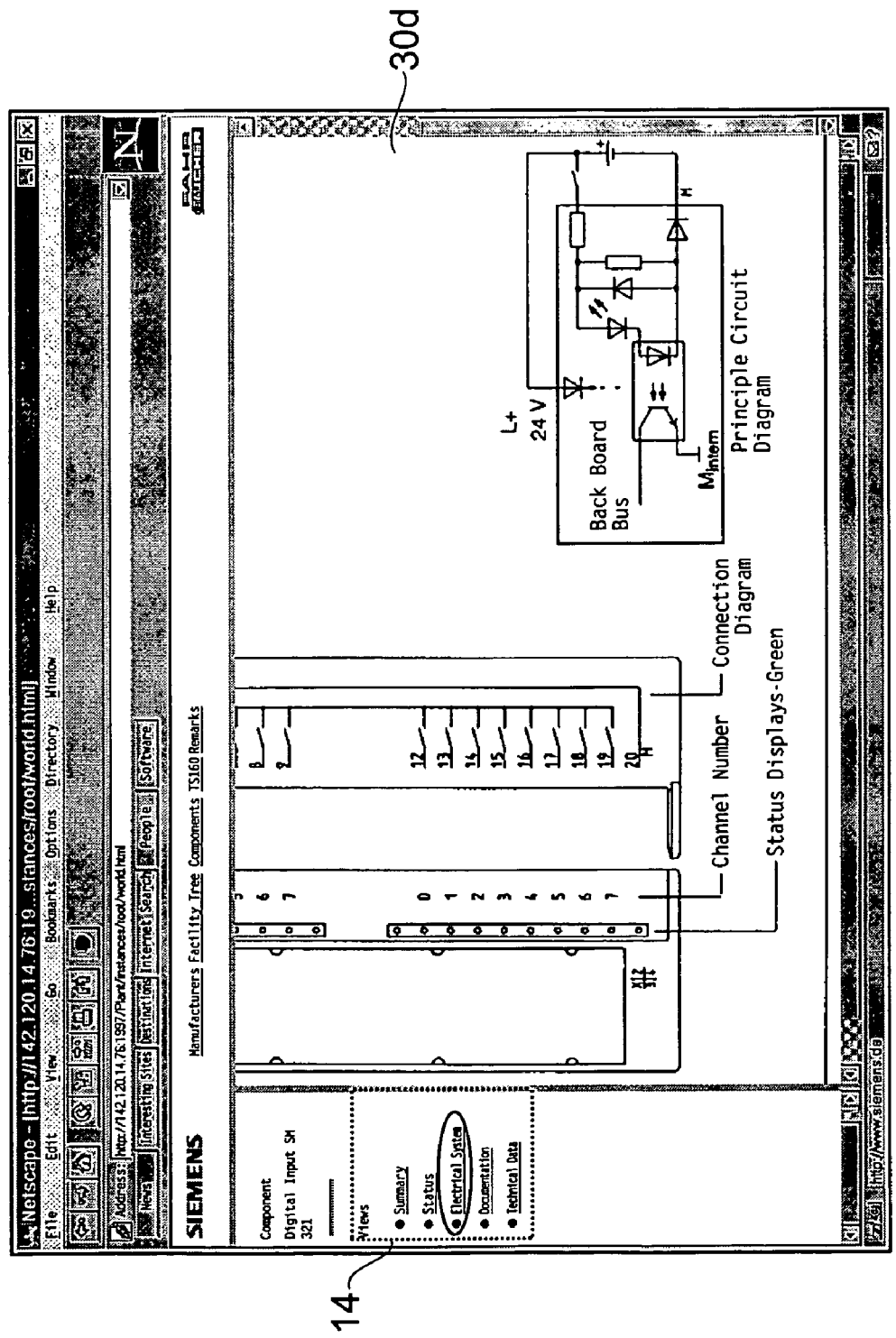

FIGS. 6a–6e show respective views (30a . . . 30e) of an individual component of the machine control, i.e., the digital input SM 321, relating to "documentation" (FIG. 6a), "summary" (FIG. 6b), "status" (FIG. 6c), "electrical system" (FIG. 6d), and "technical data" (FIG. 6e). The view 30c, which identifies the status of the digital input SM 321, has a status data field 17. In the status data field 17, current process data of the digital input SM 321 may be called up and/or predefined for operation purposes and for monitoring purposes.

One special feature of the described information, operation, and monitoring system is that various known navigation mechanisms are transferred to a single user interface for a given industrial facility. Thus, a data structure is created that links all available data sources to each other in a user-friendly manner. Therein, the system is described by means of individual components on the basis of known internet techniques.

Figure 7:
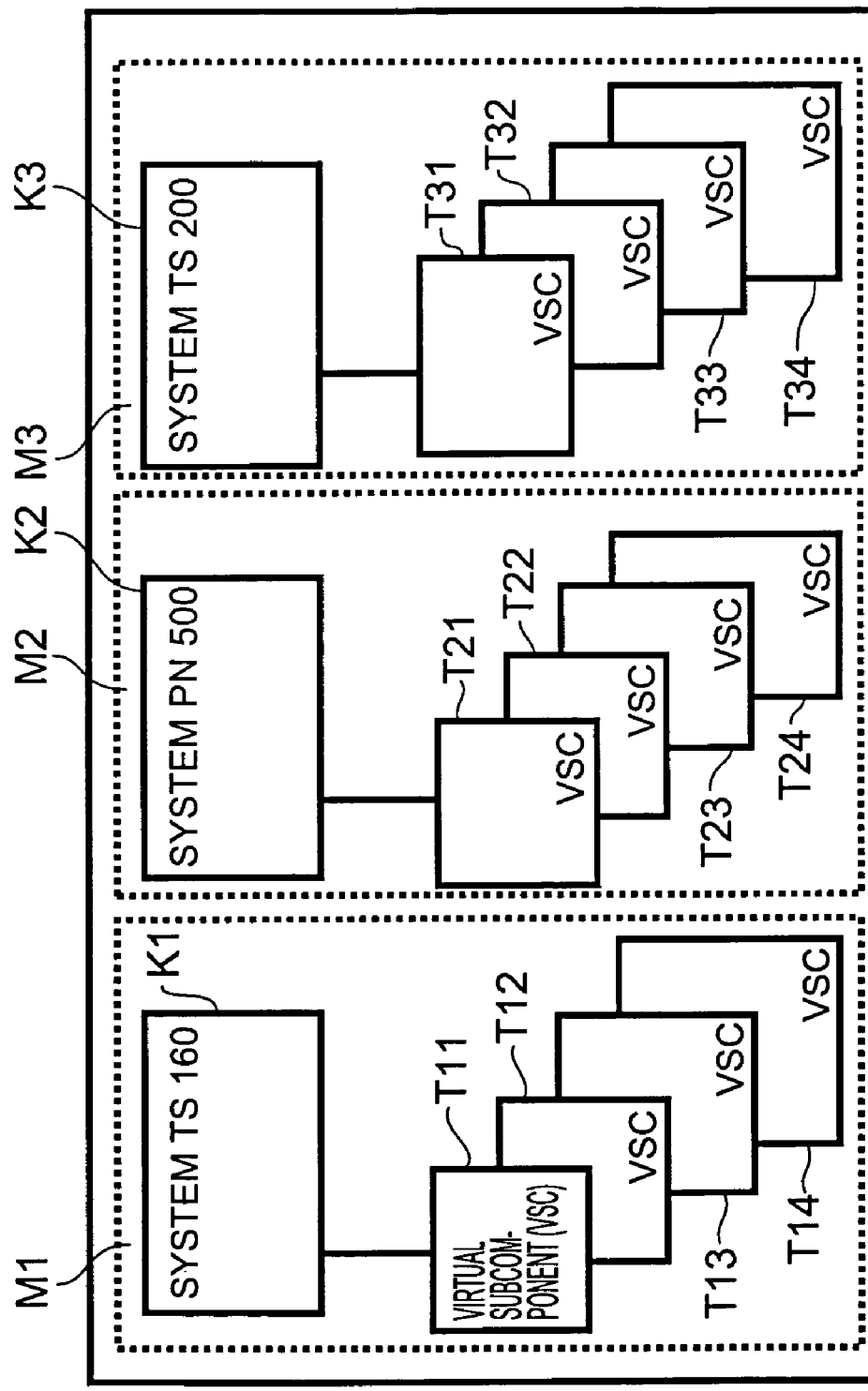
FIG. 7 is a schematic diagram of a model library having a plurality of virtual components.

FIG. 7 shows a schematic diagram of a system library, which includes a plurality of individual models M1 . . . M3 representing a first system TS 160, a second system PN 500, and a third system TS 200, respectively. The system library of the models M1, M2, M3 is stored in the data processing device 2. The model library includes the model library M1, which, in turn, includes a virtual component K1 and virtual subcomponents T11 . . . T14 for the first system TS 160. The model library M2 includes a virtual component K2 and virtual subcomponents T21 . . . T24 for the second system PN 500 and the model library M3 includes a virtual component K3 and virtual subcomponents T31 . . . T34 for the third system TS 200. Information data in the form of the subcomponents T11 . . . T14 are assigned to the component K1 of the first system TS 160. This information data represents different views of the individual virtual components of the system TS 160, which, in turn, represent the real system TS 160. Likewise, information data of lower-level virtual subcomponents in the form of the virtual subcomponents T21 . . . T24 are assigned to the virtual component K2 of the second system PN 500. Finally, information data of the virtual subcomponents T31 . . . T34 are assigned the third system TS 200.

The basic data structure of the models M1 . . . M3 and the structure of the information data will now be described with reference to the block diagram depicted in FIG. 7. The data processing device 2 generates a uniform user interface for the information data. By this uniform user interface, the virtual components K1 . . . K3 and their respective subordinate components T11 . . . T14, T21 . . . T24, T31 . . . T34 can be accessed by the user. The block diagram shown in FIG. 7 is merely a schematic example.

Other embodiments are feasible, which have any number of sub-branches of further components that are associated with the individual components K1 . . . K3. Therein, the respective model structures may be networked with each other.

In summary, the invention relates to a system 1, 2 and an associated method for a dynamic management of information data. The information data are in the form of information sources I of a virtual device K, which includes a plurality of virtual subcomponents T1 . . . Tn. The virtual device K represents a real device 20, for instance an industrial facility. A comprehensive overview of the entire system as well as specific views of the subcomponents of the device are achieved in that the virtual subcomponents are embedded as programs and/or data in a networking frame structure. Therein, the virtual subcomponents correspond to technological structures of the real device 20. The system has a data processing device 2 to manage the information data I associated with the virtual device K and to control access to the information data I. Local and/or global addresses are assigned to the virtual device K and its virtual subcomponents T1 . . . Tn. These addresses allow a user to perform a component-based navigation and a model-based navigation in different views S1 . . . SN of the system.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. An information, operating or monitoring system for a real device having real subcomponents, the system comprising:
- a data processing device, comprising a software model including virtual components, wherein the software model represents the real device, and wherein the virtual components are linked to each other in correspondence to relationships of or within the real device; and
- a display for displaying views associated with the virtual components;
- wherein at least one of the virtual components and the views include access data for accessing at least one of local information data and global information data, which are associated with the virtual components,
- wherein the virtual components comprise a virtual device and virtual subcomponents, which represent the real device and the real subcomponents, respectively, wherein the virtual device and the virtual subcomponents are designed as at least one of data and data processing programs,
- wherein the virtual device and the virtual subcomponents are linked to each other in correspondence to at least one of operational relationships, physical relationships, and technical relationships of or within the real device, and
- wherein technologically different ones of the virtual subcomponents are assigned to the virtual device, wherein technologically structured subordinate components are assigned to each of the virtual subcomponents, and wherein the access data are structured for navigating a user through the virtual device, through the technologically different virtual subcomponents, and through the subordinate components.

2. The system of claim 1, wherein the real device comprises an automation system.

3. The system of claim 1, wherein links between the virtual components form a data structure of the software model that is stored in the data processing device.

4. The system of claim 1, wherein the data processing programs are embedded in a software frame via cross-references, and wherein at least one of the software frame and the cross-references is structured to permit, for navigation purposes, access by a user to at least one of the virtual device and the virtual subcomponents.

5. The system of claim 1, further comprising: a connection between the data processing device and the real device, wherein, via the connection, control data and process data are transmitted in at least one of a unidirectional manner and a bi-directional manner; and a component arranged in the data processing device, wherein the component is structured for at least one of transmitting and receiving data.

6. A method for operating and monitoring a real device having real subcomponents, comprising:
- navigating in a model stored in a data processing device, wherein the model comprises virtual components and views, wherein the virtual components represent the real device, and wherein the views are assigned to the virtual components;
- assigning a model structure to the model, wherein the model structure is stored in the data processing device, and wherein the model structure comprises a linkage of the virtual components in correspondence to relationships of or within the real device; and
- accessing at least one of local information data and global information data via access data that are included in at least one of the virtual components and the views, wherein the local information data and the global information data are associated with the virtual components,
- wherein the virtual components comprise a virtual device and virtual subcomponents, which represent the real device and the real subcomponents, respectively, wherein the virtual device and the virtual subcomponents are designed as at least one of data and data processing programs,
- wherein the virtual device and the virtual subcomponents are linked to each other in correspondence to at least one of operational relationships, physical relationships, and technical relationships of or within the real device, and
- wherein technologically different ones of the virtual subcomponents are assigned to the virtual device, wherein technologically structured subordinate components are assigned to each of the virtual subcomponents, and wherein the access data are structured for navigating a user through the virtual device, through the technologically different virtual subcomponents, and through the subordinate components.

7. The method of claim 6, further comprising displaying the local information data and the global information data to a user via the views.

8. The method of claim 6, further comprising assigning a menu bar to a specific one of the views, wherein the menu bar identifies access capabilities to other available ones of the views, which are different from the specific one of the views.

9. The method of claim 6, further comprising transmitting data via a connection between the data processing device and the real device.

10. The method of claim 9, wherein the data comprise at least one of operation data and control data.

11. The method of claim 6, further comprising activating a virtual subcomponent as one of the views by selecting a section of an image of the real device, wherein the section represents the virtual subcomponent.

12. A user interface for operating and monitoring a device comprising:
- components interrelated through technical relationships, wherein the user interface comprises a plurality of screen windows on a screen of a display;
- wherein each screen window comprises an information set regarding one of the components of the device;
- wherein each screen window comprises at least one cross-reference via which a user selects a specific screen window within the plurality of screen windows;

wherein the respective information sets on each screen window are linked to each other by the at least one cross-reference in correspondence to the technical relationships between the components of the device;

wherein the components comprise a virtual device and virtual subcomponents, which represent the real device and the real subcomponents, respectively, wherein the virtual device and the virtual subcomponents are designed as at least one of data and data processing programs;

wherein the virtual device and the virtual subcomponents are linked to each other in correspondence to at least one of operational relationships, physical relationships, and technical relationships of or within the real device; and wherein technologically different ones of the virtual subcomponents are assigned to the virtual device, wherein technologically structured subordinate components are assigned to each of the virtual subcomponents, and wherein the access data are structured for navigating a user through the virtual device, through the technologically different virtual subcomponents, and through the subordinate components.

13. An information, operation or monitoring system for a real device having a plurality of subcomponents and a data processing device, comprising:

a model having virtual components representing the real device and views associated with the virtual components for presenting information data of the virtual components stored locally on at least one of the data processing device and a computer linked to the data processing device;

wherein the model has a model structure stored in the data processing device;

wherein the model structure is formed from a linkage of the virtual components analogously to the relationships of the real device;

wherein at least one of the virtual components and the views have access data for accessing the information data;

wherein a connection is provided between the data processing device and the real device;

wherein the data processing device has at least one of a transmission and receiving component for at least one of transmitting and receiving data;

wherein the real device is provided for at least one of unidirectional and bidirectional transmission of control and process data;

wherein the virtual components comprise a virtual device and virtual subcomponents, which represent the real device and the real subcomponents, respectively, wherein the virtual device and the virtual subcomponents are designed as at least one of data and data processing programs;

wherein the virtual device and the virtual subcomponents are linked to each other in correspondence to at least one of operational relationships, physical relationships, and technical relationships of or within the real device; and wherein technologically different ones of the virtual subcomponents are assigned to the virtual device, wherein technologically structured subordinate components are assigned to each of the virtual subcomponents, and wherein the access data are structured for navigating a user through the virtual device, through the technologically different virtual subcomponents, and through the subordinate components.

14. A method for information, operation or monitoring a real device, which includes a plurality of subcomponents, wherein a model having virtual components is provided as a representation of the real device and in which views are respectively assigned to the virtual components, via which information data of the virtual components that are stored locally on at least one of a data processing device and a computer linked to the data processing device is displayed to a user; wherein the user accesses the information data via at least one of the virtual components and access data assigned to the views; wherein a connection is provided between the data processing device and the real device; wherein the data processing device has at least one of a transmission and receiving component for at least one of transmitting and receiving data; and wherein the connection between the data processing device and the real device is provided for at least one of unidirectional and bidirectional transmission of control and process data; wherein the virtual components comprise a virtual device and virtual subcomponents, which represent the real device and the real subcomponents, respectively, wherein the virtual device and the virtual subcomponents are designed as at least one of data and data processing programs; wherein the virtual device and the virtual subcomponents are linked to each other in correspondence to at least one of operational relationships, physical relationships, and technical relationships of or within the real device; and wherein technologically different ones of the virtual subcomponents are assigned to the virtual device, wherein technologically structured subordinate components are assigned to each of the virtual subcomponents, and wherein the access data are structured for navigating a user through the virtual device, through the technologically different virtual subcomponents, and through the subordinate components.

* * * * *